(12) United States Patent
Bechtold et al.

(10) Patent No.: US 8,474,136 B2
(45) Date of Patent: Jul. 2, 2013

(54) METHOD FOR THE FABRICATION OF A CAMSHAFT AND A CORRESPONDING CAMSHAFT

(75) Inventors: Matthias Bechtold, Haslach (DE); Christian Fuchs, Steinach (DE); Johannes Tisch, Achern (DE)

(73) Assignee: Neumayer Tekfor Holding GmbH, Hausach (DE)

( * ) Notice: Subject to any disclaimer, the term of this patent is extended or adjusted under 35 U.S.C. 154(b) by 0 days.

(21) Appl. No.: 13/316,107

(22) Filed: Dec. 9, 2011

(65) Prior Publication Data

US 2012/0103130 A1    May 3, 2012

Related U.S. Application Data

(63) Continuation of application No. PCT/DE2010/000603, filed on May 29, 2010.

(30) Foreign Application Priority Data

Jun. 10, 2009    (DE) .......................... 10 2009 025 023

(51) Int. Cl.
*B21D 53/84*    (2006.01)
(52) U.S. Cl.
USPC .......................................... 29/888.1; 29/458
(58) Field of Classification Search
USPC .................... 29/888.1, 434, 458; 123/90.6
See application file for complete search history.

(56) References Cited

U.S. PATENT DOCUMENTS

| 4,419,845 | A | * | 12/1983 | Voigt et al. ....................... 451/49 |
| 4,798,178 | A | | 1/1989 | Greulich et al. |
| 4,905,538 | A | | 3/1990 | Watanabe et al. |
| 4,947,547 | A | | 8/1990 | Matt |
| 5,004,370 | A | | 4/1991 | Swars |
| 5,067,369 | A | | 11/1991 | Taniguchi |
| 5,307,708 | A | | 5/1994 | Matt |
| 5,737,975 | A | | 4/1998 | Hanisch et al. |
| 6,478,074 | B1 | | 11/2002 | Basler et al. |
| 7,146,956 | B2 | * | 12/2006 | Nomura et al. .............. 123/90.6 |
| 2004/0000213 | A1 | | 1/2004 | Hamamoto et al. |
| 2004/0016121 | A1 | | 1/2004 | Merz |

(Continued)

FOREIGN PATENT DOCUMENTS

| DE | 1 957 573 U | 3/1967 |
| DE | 23 36 241 A | 2/1975 |

(Continued)

OTHER PUBLICATIONS

International Search Report dated Sep. 15, 2010 (three (3) pages).

(Continued)

*Primary Examiner* — David Bryant
*Assistant Examiner* — Ryan J Walters
(74) *Attorney, Agent, or Firm* — Crowell & Moring LLP

(57) ABSTRACT

A method of fabricating a camshaft including at least one carrier unit and at least one functional element. The carrier unit is produced at least in part from at least one first blank by way of at least one first machining method, and the functional element is produced at least in part from at least one second blank by way of at least one second machining method. The invention further relates to a camshaft produced by the method of the invention.

2 Claims, 4 Drawing Sheets

U.S. PATENT DOCUMENTS

| | | |
|---|---|---|
| 2004/0134063 A1 | 7/2004 | Vogel |
| 2006/0081089 A1 | 4/2006 | Nigarura et al. |
| 2007/0006834 A1 | 1/2007 | Schmid |
| 2008/0276753 A1* | 11/2008 | Takamura ............ 74/567 |
| 2008/0276888 A1 | 11/2008 | Muster |

FOREIGN PATENT DOCUMENTS

| | | |
|---|---|---|
| DE | 32 09 980 A1 | 10/1982 |
| DE | 33 42 316 A1 | 5/1985 |
| DE | 35 40 979 A1 | 9/1986 |
| DE | 37 04 092 C1 | 5/1988 |
| DE | 259 575 A1 | 8/1988 |
| DE | 37 17 534 A1 | 12/1988 |
| DE | 37 17 190 C2 | 3/1989 |
| DE | 38 03 687 A1 | 8/1989 |
| DE | 38 40 905 C1 | 11/1989 |
| DE | 40 11 738 A1 | 10/1990 |
| DE | 41 21 951 C1 | 12/1992 |
| DE | 44 23 543 A1 | 3/1995 |
| DE | 44 27 201 A1 | 6/1995 |
| DE | 44 20 092 A1 | 12/1995 |
| DE | 295 19 523 U1 | 5/1996 |
| DE | 196 40 872 A1 | 4/1998 |
| DE | 197 03 260 A1 | 8/1998 |
| DE | 197 03 821 A1 | 8/1998 |
| DE | 197 10 847 A1 | 9/1998 |
| DE | 198 33 594 A1 | 1/2000 |
| DE | 199 09 184 A1 | 9/2000 |
| DE | 100 34 329 A1 | 1/2002 |
| DE | 101 01 539 A1 | 8/2002 |
| DE | 10 2004 011 815 A1 | 9/2005 |
| DE | 199 34 405 B4 | 10/2005 |
| DE | 196 22 372 B4 | 6/2006 |
| DE | 10 2004 062 518 B4 | 10/2006 |
| DE | 10 2005 045 290 A1 | 10/2006 |
| DE | 20 2006 014 691 U1 | 1/2007 |
| DE | 20 2006 018 359 U1 | 3/2007 |
| DE | 11 2005 002 568 T5 | 9/2007 |
| DE | 10 2006 029 415 A1 | 1/2008 |
| DE | 10 2007 023 087 A1 | 3/2008 |
| DE | 10 2007 023 323 A1 | 11/2008 |
| DE | 10 2005 061 979 B4 | 11/2009 |
| GB | 2 215 646 A | 9/1989 |
| GB | 2 281 601 A | 3/1995 |
| WO | WO 01/98020 A1 | 12/2001 |
| WO | WO 2004/029421 A1 | 4/2004 |
| WO | WO 2006/103012 A1 | 10/2006 |

OTHER PUBLICATIONS

German Office Action with partial English translation dated Jan. 18, 2010 (ten (10) pages).

* cited by examiner

METHOD FOR THE FABRICATION OF A CAMSHAFT AND A CORRESPONDING CAMSHAFT

CROSS REFERENCE TO RELATED APPLICATIONS

This application is a continuation of international patent application no. PCT/DE2010/000603, filed May 29, 2010, designating the United States of America and published in German on Dec. 16, 2010 as WO 2010/142266, the entire disclosure of which is incorporated herein by reference. Priority is claimed based on Federal Republic of Germany patent application no. DE 10 2009 025 023.9, filed Jun. 10, 2009, the entire disclosure of which is likewise incorporated herein by reference.

BACKGROUND OF THE INVENTION

The present invention relates to a method for the fabrication of a camshaft comprising at least one carrier unit and at least one functional element. The invention further relates to a camshaft fabricated according to this method.

Different variants of camshafts, components or fabrication processes thereof are disclosed in the prior art. For example, see DE 44 20 092, DE 10 2005 061 979, DE 20 2006 018 359, DE 10 2007 023 087, DE 41 21 951, U.S. Pat. No. 4,905,538, DE 11 2005 002 568, DE 37 17 190, DE 1 957 573, DE 44 23 543, WO 01/98020, DE 10 2004 062 518, DE 196 40 872, DE 20 2006 018 359, DE 10 2007 023 323, DE 40 11 738, DE 35 40 979, DE 100 34 329, WO 2006/103012, DE 10 2004 011 815, WO 2006/103012, DE 37 17 534, DE 295 19 523, DE 198 33 594, DE 199 34 405, DE 20 2006 018 359, DD 259 575, DE 197 03 821, DE 20 2006 014 691, DE 295 19 523, DE 44 23 543, DE 10 2005 045 290, DE 197 03 260, DE 33 42 316, DE 38 40 905, DE 38 03 687, DE 10 2006 029 415, DE 199 09 184, DE 101 01 539, WO 2004/029421, DE 41 21 951, DE 196 22 372, DE 196 40 872, DE 44 27 201, DE 20 2006 018 359, DE 23 36 241 A1, DE 32 09 980 A1 or DE 37 04 092 C1.

Camshafts are used in different vehicles and types of vehicles and therefore they should be adapted to suit the respective application. Furthermore, camshafts, as vehicle components, are subjected to various requirements for designing a vehicle, and the camshaft and the components thereof must be optimized according to these requirements. In the prior art, the camshafts or, for example, the cams are generally designed or optimized only in terms of one property or one requirement. An example of such a property or requirement is the weight, simplicity of production or the frictional properties of the camshaft.

SUMMARY OF THE INVENTION

It is an object of the invention to provide a method for the fabrication of a camshaft, which method allows an adaption to various design and optimization requirements with the maximum ease possible.

This and other objects are achieved in accordance with the present invention by the fabrication process and by the camshaft produced according to this fabrication process as described and claimed hereinafter.

In accordance with the method of the invention, the carrier unit is produced, at least in part, by at least a first machining process from at least a first blank, and the at least one functional element is produced, at least in part, by at least a second machining process from at least a second blank. This basic construction allows the camshaft and the components thereof to be designed according to the respective requirements or the optimization to be achieved. Additional functional elements corresponding to the functional element referred to above or the designs mentioned below are also fabricated or machined in specific embodiments or used in the fabrication of the camshaft. According to some of the following embodiments, it is possible, in particular, to virtually fabricate the camshaft according to the modular design principle. That is, it is possible for different materials, different coatings or different forming processes to be combined together, for example. Specifically, coatings can also be applied only to portions of the components or only at times, for example. Thus the coating can also be oil or any other material that improves anti-frictional properties.

Furthermore, different optimization requirements are addressed in some embodiments, and different requirements are also allowed for by a combination of various components of the camshaft. Depending on the embodiment, it is also possible to prepare components such as the cams or at least one of the cams appropriately even before its attachment to the carrier unit. Advantageously, the finished camshaft comprises at least one cam. In one embodiment, provision is made for the carrier unit to be produced from the first blank and at least one further blank. Thus the carrier unit is fabricated from several blanks. In one embodiment, the at least one functional element is produced from the second blank and at least one further blank. Thus the functional element can also be composed of several blanks.

The following embodiments substantially relate to the embodiment of the materials, of which the two blanks or the carrier unit and the functional element are made. In one embodiment, the carrier unit is produced, at least in part, from the at least one first blank made of a first material that meets at least a first optimization requirement. In one embodiment, the at least one functional element is produced, at least in part, from the at least one second blank made of a second material that meets at least a second optimization requirement. Thus the selection of the material of the first and/or second blank is based on a first and second optimization requirement respectively. The requirements can be identical or different. That is, for example, there is sought one common optimization for the entire camshaft or at least the two components, namely the carrier unit and the functional element, are optimized separately according to their tasks or the forces applied to them or the stresses acting on them. The two optimization requirements can also be based on a common optimization requirement that includes individual nuances.

In one embodiment, the first optimization requirement and the second optimization requirement are substantially identical. In one embodiment, the first optimization requirement and the second optimization requirement are different. In one embodiment, the first material and the second material are substantially identical. In one embodiment, the first material and the second material are different. In one embodiment, the first material or the second material is steel, at least in part. In one embodiment, the first material or the second material is hardened steel, at least in part. In one embodiment, the first material or the second material is rolled steel, preferably 100Cr6 steel, at least in part. In one embodiment, the first material or the second material is, at least in part, steel having carbon content that can be predetermined. In one embodiment, the first material or the second material is, at least in part, cast steel. In one embodiment, the first material or the second material is, at least in part, sinter material. In one embodiment, the first material or the second material is, at least in part, plastics. In general, the term "plastics" also includes polymers among other things. In one embodiment, the first material or the second material is, at least in part, ceramics. In one embodiment, the first material or the second material is, at least in part, an aluminum alloy. In one embodiment, the first material or the second material is, at least in part, a stainless steel and/or a precious metal. In one embodiment, the first material or the second material is, at least in part, a sheet metal. In one embodiment, the first material or the second material is, at least in part, a carbon material. In one embodiment, the first material or the second material is, at least in part, a fiber-reinforced material. In one embodiment, the first material or the second material is, at least in part, a glass fiber reinforced material. One embodiment is of such type that the first material or the second material is, at least in part, glass-fiber material. In one embodiment, the first material or the second material is, at least in part, a fiber-reinforced composite. In one embodiment, the first material or the second material is, at least in part, a biorenewable material. In one embodiment, the first material or the second material is, at least in part, a biodegradable material. In one embodiment, the first material or the second material is, at least in part, paper or bamboo. In one embodiment, the first material or the second material is, at least in part, a memory metal. In one embodiment, the first material or the second material is, at least in part, a material having a crystal structure. In one embodiment, the first material or the second material is glass, at least in part. The materials can be substances used by themselves or combinations of contents of the embodiments mentioned above. That is, the individual materials of the above embodiments can also be combined directly with each other and with further substances.

The further embodiments primarily relate to the geometric design of the components of the camshaft that are preferably made of the materials mentioned above. In one embodiment, the carrier unit is produced substantially in the form of a cylindrical unit. In this context, provision can be made for a circular, prismatic, or angular cross-section or an external contour having an arbitrarily selected profile. The carrier unit is substantially designed such that its height exceeds the dimensions of the base or the cross-sectional area. The external profile can also be adapted to vary in certain sections.

In one embodiment, the carrier unit is produced substantially in the form of a completely filled unit. In one embodiment, the carrier unit is produced substantially in the form of a hollow pipe. In one embodiment, the carrier unit is produced substantially in the form of a partially filled pipe. In one embodiment, the carrier unit is produced in the form of a unit comprising at least one open end. In one embodiment, the carrier unit is substantially produced in the form of a cylindrical unit having a substantially circular cross-section. In one embodiment, the carrier unit is substantially produced in the form of a unit comprising an at least partially profiled external surface. In one embodiment, the carrier unit is produced in the form of a unit that can be adjusted, particularly telescopically, in terms of its length. Thus the carrier unit in this embodiment has a variable length that is realized by a telescopic construction in one embodiment. In one embodiment, the carrier unit is produced in the form of a unit having at least a duct-like structure. A structure of such type is used, for example, to supply oil or to provide a suitable hydraulic system in order to alter, for example, the adjustment of individual functional elements during use. In one embodiment, the carrier unit is substantially produced in the form of a unit, more particularly a pipe, comprising at least one protuberance and/or an indentation. Thus in this embodiment, the carrier unit preferably has a profiling of such type that functional elements can be applied or fixed to the dedicated portions, to particular advantage.

In one embodiment, the carrier unit is substantially produced in the form of a unit, more particularly a pipe, comprising at least one second functional element that is molded on the pipe. In this embodiment, the carrier unit is designed such that its structure corresponds to the additional functional element; that is, the additional functional element is substantially formed integrally with the carrier unit in this case. For example, it is known in the prior art that camshafts are produced as part of the carrier unit together with the latter by an expanding process (e.g., internal high pressure forming). In one embodiment, the carrier unit is produced in the form of a unit comprising at least one distinguishing mark serving particularly for the purpose of identification. In one embodiment, the at least one functional element is produced in the form of a unit comprising at least one distinguishing mark serving particularly for the purpose of identification. Thus the carrier unit and/or the functional element are designed in such a way that they each bear a distinguishing mark that serves for allocating the carrier unit and/or the functional element to a production batch or the like, for example. For example, a batch tracing is made possible by such a distinguishing mark.

In one embodiment, the at least one functional element is produced in the form of a cam. In one embodiment, the at least one functional element is produced in the form of a bearing ring for a cam. In one embodiment, the at least one functional element is produced in the form of a rolling bearing or a rolling-bearing ring. The rolling bearing serves, for example, for mounting the camshaft in the engine block. In one embodiment, the at least one functional element is produced in the form of a toothed wheel. For example, the camshaft can be driven by a toothed wheel of such type. In one embodiment, the at least one functional element is produced in the form of a signal-transmitter wheel that serves for detecting the position of at least one cam. For example, the position of the cams can be determined by a signal-transmitter wheel of such type.

In one embodiment, the at least one functional element is produced in the form of an adjustment element for at least one cam. In one embodiment, the at least one functional element is produced in the form of a closure element for the carrier unit. A closure element of such type closes, for example, an open end of the carrier unit. Embodiments of the interaction and the joint between the carrier unit and the functional element are suggested below. In one embodiment, the carrier unit and the at least one functional element are substantially formed integrally. In one embodiment, the first and the second blanks are combined to form one blank. In a further embodiment, the first blank and the second blank are combined to form a whole blank, from which the carrier unit and the functional element are then formed integrally. In one embodiment, the at least one functional element is applied to the carrier unit, and the at least one functional element is attached to the carrier unit. In one embodiment, the at least one functional element is applied to the carrier unit in such a way that any contact between the functional element and the carrier unit is substantially prevented during the application. Thus, for example, the functional element is substantially prevented from rubbing against the carrier unit in one embodiment. For this purpose, for example, the functional element and the carrier unit are dimensioned such that sufficient play is provided between the two or a suitable play is provided for the application, for example, by an expanding or narrowing process. Alternatively or additionally, an anti-friction agent is applied for this purpose.

In one embodiment, the at least one functional element is attached to the carrier unit so as to be movable in at least one direction and/or about an axis relative to the carrier unit. In this embodiment, the functional element is movable in at least one direction and can thus also be adjusted or altered. In one embodiment, the at least one functional element is attached to the carrier unit so as to be releasable. Thus provision is made for a reversible attachment in this embodiment. In one embodiment, the carrier unit is stretched and squashed at least before the application of the at least one functional element. In one embodiment, the carrier unit is brought substantially to the same temperature as the at least one functional element at least before the application of the at least one functional element. In one embodiment, the carrier unit is cooled relative to the temperature of the at least one functional element at least before the application of the at least one functional element. In one embodiment, the carrier unit is heated relative to the temperature of the at least one functional element at least before the application of the at least one functional element. In one embodiment, the at least one functional element is brought substantially to the same temperature as the carrier unit at least before its application to the carrier unit. In one embodiment, the at least one functional element is cooled relative to the temperature of the carrier unit at least before its application to the carrier unit. In one embodiment, the at least one functional element is heated relative to the temperature of the carrier unit at least before its application to the carrier unit.

In one embodiment, the at least one functional element is welded, at least in part, to the carrier unit. In one embodiment, the at least one functional element is soldered, at least in part, to the carrier unit. In one embodiment, the at least one functional element is glued, at least in part, to the carrier unit. In one embodiment, the at least one functional element is attached, at least in part, by a press fit to the carrier unit. In one embodiment, the at least one functional element is attached, at least in part, by an electromagnetic force to the carrier unit. In one embodiment, the at least one functional element is attached positively, at least in part, to the carrier unit. In one embodiment, the at least one functional element is attached non-positively, at least in part, to the carrier unit. In one embodiment, the at least one second blank is applied to the carrier unit, and the at least one second blank is attached to the carrier unit. In this variant where the second blank is applied to the carrier unit, it is also possible to use the above process steps relating to the application and attachment of the functional element to the carrier unit.

There are then suggested embodiments in which one or more coatings are applied to the blanks or the carrier unit and/or the functional element. In one embodiment, at least one first coating is applied to at least one portion of the first blank and/or the carrier unit. In one embodiment, the at least one first coating is applied to the at least one portion of the carrier unit before the functional element or the second blank is applied to the carrier unit. In one embodiment, the at least one first coating is applied to the at least one portion of the carrier unit after the functional element or the second blank is applied to the carrier unit. In one embodiment, the at least one first coating is applied to the at least one portion of the carrier unit after the functional element or the second blank is attached to the carrier unit. In one embodiment, the at least one first coating is applied to at least one portion of the first blank and/or the carrier unit in such a way that the second blank and/or the at least one functional element is substantially free, at least at times, from the first coating. In one embodiment, the second blank and/or the at least one functional element is substantially freed, at least in part, from the at least one first coating after the application of the at least one first coating. In one embodiment, the at least one first coating is applied to the at least one portion of the first blank and/or the carrier unit in such a way that the at least one functional element is substantially free from the at least one first coating at least after the functional element is applied to the carrier unit. In one embodiment, the at least one first coating is applied to the at least one portion of the first blank and/or the carrier unit in such a way that the at least one functional element is substantially free from the at least one first coating at least after the functional element is attached to the carrier unit. In one embodiment, the at least one first coating is applied only to at least one functional portion of the first blank and/or only to at least one functional portion of the carrier unit.

In one embodiment, the at least one functional element is applied to the at least one functional portion of the first blank or the carrier unit, or the second blank is applied to the at least one functional portion of the first blank or the carrier unit. In one embodiment, the at least one functional element is attached to the at least one functional portion of the first blank or the carrier unit, or the second blank is attached to the at least one functional portion of the first blank or the carrier unit.

In one embodiment, the at least one functional portion is a contact surface with at least one further component, more particularly a bearing bracket or a bearing block that is preferably a single-part component. Thus the bearing support is designed so as to be a single-part component. That is, the bearing support is undivided into parts. Alternatively, the bearing support can also be a multi-part component. That is, the bearing support is divided into parts. In the single-piece version, the bearing bracket or the bearing block in one embodiment is thus "threaded" onto the carrier unit similarly to another functional element when the camshaft is assembled. In one embodiment, the first blank and/or the carrier unit is coated, substantially completely, with the at least one first coating. In one embodiment, the material of the first coating corresponds at least to a third optimization requirement. In one embodiment, at least a third coating is applied to at least one portion of the first blank and/or the carrier unit. In one embodiment, at least one second coating is applied to at least one functional surface of the second blank and/or the functional element. In one embodiment, the at least one second coating is applied to the at least one functional surface of the functional element before the application of the functional element to the carrier unit. In one embodiment, the at least one second coating is applied to the at least one functional surface of the functional element after the application of the functional element to the carrier unit. In one embodiment, the at least one second coating is applied to the at least one functional surface of the functional element after the attachment of the functional element to the carrier unit. In one embodiment, the at least one second coating is applied to the at least one functional surface of the second blank and/or the functional element in such a way that the first blank and/or the carrier unit is substantially free, at least at times, from the second coating. In one embodiment, the first blank and/or the carrier unit is substantially freed, at least in part, from the at least one second coating after the application of the at least one second coating. In one embodiment, the at least one second coating is applied to the at least one functional surface of the second blank and/or the functional element in such a way that the carrier unit is substantially free from the second coating at least after the application of the at least one functional element to the carrier unit. In one embodiment, the at least one second coating is applied to the at least one functional surface of the second blank and/or the functional element in such a way that the carrier unit is substantially free from the at least one second coating at least after the attachment of the functional element to the carrier unit. In one embodiment, the at least one second coating is applied only to the at least one functional surface of the second blank and/or only to the at least one functional surface of the at least one functional element.

In one embodiment, the at least one functional element is applied by its at least one functional surface to the first blank or the carrier unit, or the second blank is applied by its at least one functional surface to the first blank or the carrier unit. In one embodiment, the at least one functional element is attached by its at least one functional surface to the first blank or the carrier unit, or the second blank is attached by its at least one functional surface to the first blank or the carrier unit. In one embodiment, the at least one functional surface is a contact surface with at least one further component.

In one embodiment, the second blank and/or the at least one functional element is coated, substantially completely, with the at least one second coating. In one embodiment, the material of the second coating corresponds at least to a fourth optimization requirement. In one embodiment, at least a fourth coating is applied to at least one portion of the second blank and/or the at least one functional element. In one embodiment, the third optimization requirement and the fourth optimization requirement are substantially identical. In one embodiment, the third optimization requirement and the fourth optimization requirement are different. In one embodiment, the material of the first coating and the material of the second coating are substantially identical. In one embodiment, the material of the first coating and the material of the second coating are different. The coating or coatings can each be applied specifically only to individual portions of the carrier unit or the functional element. Thus it is also possible to reduce production costs.

If the functional element and the carrier unit are fabricated so as to be ready for installation, that is, without necessitating any finishing, then the coatings can be produced readily and economically on the single components. The coatings can also correspond to different optimization requirements. Thus the coating of the carrier unit can reduce, for example, the friction coefficient relative to a bearing, whereas the coating of the functional element can locally increase the friction coefficient at a connecting region between the carrier unit and the functional element. Thus, depending on the embodiment, the coatings serve for the actual production process and/or they provide the camshaft with a suitably necessary or advantageous property that can also relate, for example, only to one component of the camshaft. The latter also offers the advantage that the coating need not be applied to the complete camshaft. More particularly, different coatings can also be applied to different components or portions of the camshaft depending on the embodiment. This is very advantageous when addressing the different conditions to which the portions or components of the camshaft are subjected.

In one embodiment, the material of the first coating or the material of the second coating is, at least in part, a material that increases the friction coefficient. In one embodiment, the material of the first coating or the material of the second coating is, at least in part, a material that reduces the friction coefficient. In one embodiment, provision is made to use a coating that reduces damping effects. Alternatively, a coating that increases the damping effects is also used. In general, coatings can also be vapor-deposited. In one embodiment, the material of the first coating or the material of the second coating is, at least in part, a material that prevents corrosion. In one embodiment, the material of the first coating or the material of the second coating is, at least in part, a DLC coating material. Thus the coating in this embodiment is one that comprises a diamond-like carbon material, at least in part. In one embodiment, the material of the first coating or the material of the second coating is, at least in part, a hydrophobic material. In one embodiment, the material of the first coating or the material of the second coating is, at least in part, a hydrophilic material. In one embodiment, the material of the first coating or the material of the second coating is, at least in part, a nanoparticle material. In one embodiment, the material of the first coating or the material of the second coating is, at least in part, a superhydrophobic material. In one embodiment, the material of the first coating or the material of the second coating is, at least in part, one that increases electrical resistance. In one embodiment, the material of the first coating or the material of the second coating is, at least in part, one that reduces electrical resistance. In one embodiment, the material of the first coating or the material of the second coating is, at least in part, one that increases thermal conductance. In one embodiment, the material of the first coating or the material of the second coating is, at least in part, one that reduces thermal conductance. In one embodiment, the material of the first coating or the material of the second coating is, at least in part, a dye or paint. In one embodiment, the material of the first coating or the material of the second coating is, at least in part, oil. The oil can facilitate the application of the functional element to the carrier unit, for example.

In one embodiment, the first coating and/or the second coating is applied such that the respective coating remains substantially only for the duration of the fabrication of the camshaft. Thus in this embodiment, at least one coating is applied substantially only for the period of time in which the camshaft is fabricated. That is, the coating in question is not a permanent one. In one embodiment, the first coating and/or the second coating is removed, at least in part. In one embodiment, this removal of coating takes place, in part, as early as during the fabrication of the camshaft, while this removal of coating is carried out after the fabrication of the camshaft in another embodiment. In addition to or as a substitute for the coating, direct interventions in the external layer of the blanks or the carrier unit and/or the functional element are suggested below.

In one embodiment, the surface of the first blank and/or the surface of the carrier unit is modified up to a penetration depth over at least one region in terms of its composition and/or at least one property by at least a first modification process. In one embodiment, the surface of the first blank and/or the surface of the carrier unit is modified up to a penetration depth over at least one region in terms of its composition and/or at least one property by at least a first modification process before the functional element or the second blank is applied to the carrier unit or the first blank. In one embodiment, the surface of the first blank and/or the surface of the carrier unit is modified up to a penetration depth over at least one region in terms of its composition and/or at least one property by at least a first modification process after the functional element or the second blank is applied to the carrier unit or the first blank. In one embodiment, the surface of the first blank and/or the surface of the carrier unit is modified up to a penetration depth over at least one region in terms of its composition and/or at least one property by at least a first modification process after the functional element or the second blank is attached to the carrier unit or the first blank.

In one embodiment, the surface of the first blank and/or the surface of the carrier unit is modified up to a penetration depth over at least one region in terms of its composition and/or at least one property by at least a first modification process in such a way that the second blank and/or the at least one functional element is substantially free, at least at times, from the modification. In one embodiment, the surface of the first blank and/or the surface of the carrier unit is modified up to a penetration depth over at least one region in terms of its composition and/or at least one property by at least a first modification process in such a way that the at least one second blank and/or the at least one functional element is substantially free from the modification at least after the at least one functional element or the at least one second blank is applied to the carrier unit or the at least one first blank. In one embodiment, the surface of the first blank and/or the surface of the carrier unit is modified up to a penetration depth over at least one region in terms of its composition and/or at least one property by at least a first modification process in such a way that the at least one second blank and/or the at least one functional element is substantially free from the modification at least after the at least one functional element or the at least one second blank is attached to the carrier unit or the at least one first blank.

In one embodiment, the surface of the first blank and/or the surface of the carrier unit is modified up to a penetration depth only over at least one modification region in terms of its composition and/or at least one property by at least a first modification process. In one embodiment, the at least one functional element is applied to the at least one modification region of the first blank or the carrier unit or the second blank is applied to the at least one modification region of the first blank or the carrier unit. In one embodiment, the at least one functional element is attached to the at least one modification region of the first blank or the carrier unit or the second blank is attached to the at least one modification region of the first blank or the carrier unit. In one embodiment, the at least one modification region is a contact surface with at least one further component, more particularly a bearing bracket or a bearing block.

In one embodiment, the surface of the first blank and/or the surface of the carrier unit is modified, substantially completely, up to a penetration depth in terms of its composition and/or at least one property by at least a first modification process. In one embodiment, the first modification process corresponds at least to a fifth optimization requirement. In one embodiment, the surface of the first blank and/or the surface of the carrier unit is modified up to a penetration depth over at least one region in terms of its composition and/or at least one property by at least a third modification process. In one embodiment, the surface of the second blank and/or the surface of the functional element is modified up to a penetration depth over at least one region in terms of its composition and/or at least one property by at least a second modification process. In one embodiment, the surface of the second blank and/or the surface of the functional element is modified up to a penetration depth over at least one region in terms of its composition and/or at least one property by at least a second modification process before the functional element or the at least one second blank is applied to the carrier unit or the at least one first blank. In one embodiment, the surface of the second blank and/or the surface of the functional element is modified up to a penetration depth over at least one region in terms of its composition and/or at least one property by at least a second modification process after the functional element or the at least one second blank is applied to the carrier unit or the at least one first blank.

In one embodiment, the surface of the second blank and/or the surface of the functional element is modified up to a penetration depth over at least one region in terms of its composition and/or at least one property by at least a second modification process after the functional element or the at least one second blank is attached to the carrier unit or the at least one first blank. In one embodiment, the surface of the second blank and/or the surface of the functional element is modified up to a penetration depth over at least one region in terms of its composition and/or at least one property by at least a second modification process in such a way that the first blank and/or the carrier unit is substantially free, at least at times, from the modification. In one embodiment, the surface of the second blank and/or the surface of the functional element is modified up to a penetration depth over at least one region in terms of its composition and/or at least one property by at least a second modification process in such a way that the first blank and/or the carrier unit is substantially free from the modification at least after the functional element or the at least one second blank is applied to the carrier unit or the at least one first blank. In one embodiment, the surface of the second blank and/or the surface of the functional element is modified up to a penetration depth over at least one region in terms of its composition and/or at least one property by at least a second modification process in such a way that the first blank and/or the carrier unit is substantially free from the modification at least after the functional element or the at least one second blank is attached to the carrier unit or the at least one first blank. In one embodiment, the surface of the second blank and/or the surface of the functional element is modified up to a penetration depth only over at least one modification portion in terms of its composition and/or at least one property by the second modification process.

In one embodiment, the at least one functional element is applied by its at least one modification portion to the first blank or the carrier unit or the second blank is applied by its at least one modification portion to the first blank or the carrier unit. In one embodiment, the at least one functional element is attached by its at least one modification portion to the first blank or the carrier unit or the second blank is attached by its at least one modification portion to the first blank or the carrier unit. In one embodiment, the at least one modification portion is a contact surface with at least one further component. In one embodiment, the surface of the second blank and/or the surface of the functional element is modified, substantially completely, up to a penetration depth in terms of its composition and/or at least one property by the second modification process. In one embodiment, the second modification process corresponds to at least a sixth optimization requirement. In one embodiment, the surface of the second blank and/or the surface of the functional element is modified up to a penetration depth over at least one region in terms of its composition and/or at least one property by at least a fourth modification process.

In one embodiment, the surface of the first blank and/or the surface of the carrier unit and/or the surface of the second blank and/or the surface of the functional element is modified at least in terms of hardness. In one embodiment, the surface of the first blank and/or the surface of the carrier unit and/or the surface of the second blank and/or the surface of the functional element is modified at least in terms of structural composition. In one embodiment, the surface of the first blank and/or the surface of the carrier unit and/or the surface of the second blank and/or the surface of the functional element is modified at least in terms of porosity. In one embodiment, the surface of the first blank and/or the surface of the carrier unit and/or the surface of the second blank and/or the surface of the functional element is modified at least in terms of aging behavior.

In one embodiment, the fifth optimization requirement and the sixth optimization requirement are substantially identical.

In one embodiment, the fifth optimization requirement and the sixth optimization requirement are different. In one embodiment, the first modification process and the second modification process are substantially identical. In one embodiment, the first modification process and the second modification process are substantially different. In one embodiment, the first modification process or the second modification process involves, at least in part, the introduction of a substance. In one embodiment, the first modification process or the modification process involves, at least in part, the introduction of nitrogen or a nitrogen compound. In one embodiment, the first modification process or the second modification process involves, at least in part, the introduction of carbon or a carbon compound. In one embodiment, the first modification process or the second modification process involves, at least in part, the introduction of boron or a boron compound. In one embodiment, the first modification process or the second modification process involves, at least in part, the introduction of a noble gas or a noble-gas compound. In one embodiment, the first modification process or the second modification process involves, at least in part, the introduction of oxygen or an oxygen compound.

In one embodiment, the first modification process or the second modification process involves, at least in part, the initiation of a chemical reaction. In one embodiment, the first modification process or the second modification process involves, at least in part, exposure to electromagnetic radiation. In one embodiment, the first modification process or the second modification process involves, at least in part, exposure to radioactive radiation. In one embodiment, the first modification process or the second modification process involves, at least in part, a heat treatment. In one embodiment, the first modification process or the second modification process involves, at least in part, nitriding. In one embodiment, the first modification process or the second modification process involves, at least in part, the application of pressure. In one embodiment, the first modification process or the second modification process involves, at least in part, a roughening process. In one embodiment, the first modification process or the second modification process involves, at least in part, a smoothing process.

The coatings and the modifications of the surfaces can also be combined with each other. In one embodiment, the surface of the first blank and/or the carrier unit is modified before the application of the at least one first coating to the first blank and/or the carrier unit. In one embodiment, the surface of the first blank and/or the carrier unit is modified after the application of the at least one first coating to the first blank and/or the carrier unit. In one embodiment, the surface of the first blank and/or the carrier unit is modified substantially at the same time as the application of the at least one first coating to the first blank and/or the carrier unit. In one embodiment, the surface of the second blank and/or the functional element is modified before the application of the at least one second coating to the second blank and/or the functional element. In one embodiment, the surface of the second blank and/or the functional element is modified substantially at the same time as the application of the at least one second coating to the second blank and/or the functional element. In one embodiment, the surface of the second blank and/or the functional element is modified after the application of the at least one second coating to the second blank and/or the functional element.

Furthermore, individual processes for machining the blanks are suggested below that can also be combined together suitably in that they are carried out substantially at the same time or with time delay relative to each other, for example. In one embodiment, the first machining process or the second machining process is a cold-pressing operation. In one embodiment, the first machining process or the second machining process is a hot-pressing operation. In one embodiment, the first machining process or the second machining process is a semi-hot pressing operation. In one embodiment, the first machining process or the second machining process is a metal-cutting operation. In one embodiment, the first machining process or the second machining process is a milling operation. In one embodiment, the first machining process or the second machining process is a broaching operation. In one embodiment, the first machining process or the second machining process is an etching operation. In one embodiment, the first machining process or the second machining process is a sintering operation. In one embodiment, the first machining process or the second machining process is a heat-treatment operation. In one embodiment, the first machining process or the second machining process is a quenching operation. In one embodiment, the first machining process or the second machining process is a rotary-swaging operation. In one embodiment, the first machining process or the second machining process is a casting process.

The selection of the materials involved or the coating or the type of surface modification is based on the optimization requirements to be met in each case. These optimization requirements, based on which the selection of the above embodiments is made, are discussed below. In this context, it is possible for different optimization requirements to be met by an appropriate combination of embodiments of the camshaft by its manufacturing method. In one embodiment, the first optimization requirement and/or the second optimization requirement and/or the third optimization requirement and/or the fourth optimization requirement and/or the fifth optimization requirement and/or the sixth optimization requirement is a reduction of weight. In one embodiment, the first optimization requirement and/or the second optimization requirement and/or the third optimization requirement and/or the fourth optimization requirement and/or the fifth optimization requirement and/or the sixth optimization requirement is an increase of weight.

In one embodiment, the first optimization requirement and/or the second optimization requirement and/or the third optimization requirement and/or the fourth optimization requirement and/or the fifth optimization requirement and/or the sixth optimization requirement is the increase of friction coefficient. In one embodiment, the first optimization requirement and/or the second optimization requirement and/or the third optimization requirement and/or the fourth optimization requirement and/or the fifth optimization requirement and/or the sixth optimization requirement is a reduction of friction coefficient. In one embodiment, the first optimization requirement and/or the second optimization requirement and/or the third optimization requirement and/or the fourth optimization requirement and/or the fifth optimization requirement and/or the sixth optimization requirement is the improvement of vibration behavior. In one embodiment, the first optimization requirement and/or the second optimization requirement and/or the third optimization requirement and/or the fourth optimization requirement and/or the fifth optimization requirement and/or the sixth optimization requirement is the increase of load-bearing capacity.

In one embodiment, the first optimization requirement and/or the second optimization requirement and/or the third optimization requirement and/or the fourth optimization requirement and/or the fifth optimization requirement and/or the sixth optimization requirement is the reduction of material fatigue. In one embodiment, the first optimization requirement and/or the second optimization requirement and/or the third optimization requirement and/or the fourth optimization requirement and/or the fifth optimization requirement and/or the sixth optimization requirement is the reduction of wear. In one embodiment, the first optimization requirement and/or the second optimization requirement and/or the third optimization requirement and/or the fourth optimization requirement and/or the fifth optimization requirement and/or the sixth optimization requirement is the increase of environmental compatibility. In one embodiment, the first optimization requirement and/or the second optimization requirement and/or the third optimization requirement and/or the fourth optimization requirement and/or the fifth optimization requirement and/or the sixth optimization requirement is the reduction of installation space in at least one direction in space.

In one embodiment, at least two optimization requirements are identical from among the first optimization requirement, the second optimization requirement, the third optimization requirement, the fourth optimization requirement, the fifth optimization requirement, and the sixth optimization requirement. In one embodiment, at least two optimization requirements differ from each other from among the first optimization requirement, the second optimization requirement, the third optimization requirement, the fourth optimization requirement, the fifth optimization requirement, and the sixth optimization requirement.

In one embodiment, the at least one functional element is fabricated in the form of a cam comprising at least one through hole. In one embodiment, the at least one functional element is fabricated in the form of a cam comprising at least one through hole that has a substantially cylindrical geometry. In one embodiment, the at least one functional element is fabricated in the form of a cam comprising at least one through hole that has a substantially circular cross-section. In general, the cross-section of the hole is preferably adapted to correspond to the external geometry of the carrier unit, specifically, that region of the carrier unit, to which the cam is attached. In one embodiment, the at least one functional element is fabricated in the form of a cam comprising at least one through hole that comprises a portion of partially circular cross-section. Preferably, this partially circular portion is used for ensuring the press fit of the cam on the carrier unit or on a corresponding bearing ring.

In one embodiment, the at least one functional element is fabricated in the form of a cam comprising at least one through hole that comprises a portion of partially circular cross-section, and the partially circular portion encloses at least a central angle of 180°. In one embodiment, the at least one functional element is fabricated in the form of a cam comprising at least one through hole of partially circular cross-section, and the partially circular portion is adjoined by a portion that is designed such that the cross-sectional area which it surrounds and which adjoins the cross-sectional area surrounded by the partially circular portion is larger than the cross-sectional area that would be encompassed by a partially circular portion supplementing the existing partially circular portion to form a full circle. In this embodiment, the geometry of the hole is such that there is a partially circular portion which is adjoined by a portion deviating from the partially circular shape. This portion that is not partially circular is designed such that the area which it surrounds is larger than the area that would be surrounded by a partially circular portion that would supplement the existing partially circular portion to form a full circle. That is, the geometry of one portion of the cam is designed such that the cam preferably has less material in this region since the hole, when enlarged, involves the use of less material for the cam and consequently less weight thereof while the external contour of the cam is still retained. The embodiments of the cam mentioned here also relate only to the fabrication of the cam.

In one embodiment, the at least one functional element is fabricated in the form of a cam comprising at least one through hole that has at least one continuous wedge-shaped indentation. A hole of such type can be produced, for example, by a forming or sintering operation possibly followed by a turning process. In general, a turning process can also be carried out for all other embodiments of the camshaft or individual components thereof. A cam is thus designed such that it comprises at least one through hole that has a cross-section comprising a partially circular portion. The partially circular portion serves for ensuring the press fit of the cam on the shaft or a bearing ring. In one embodiment of a cam of such type, the partially circular portion encloses at least a central angle ($\alpha$) of 180°.

In a further embodiment, the partially circular portion is adjoined by a portion, which deviates from a portion that would supplement the existing partially circular portion of the cross-section to form a substantially fully circular cross-section and as a result of which the cross-section has a larger cross-sectional area than a substantially fully circular cross-section. Thus the portion adjoining the partially circular portion deviates from the partially circular shape. The portion that is not partially circular is designed such that the area which it surrounds is larger than the area that would be surrounded by a partially circular portion that would supplement the existing partially circular portion to form a full circle. Thus the geometry of one portion of the cam is designed such that the cam preferably has less material in this region and therefore also less weight. In one embodiment, the portion adjoining the partially circular portion is substantially wedge-shaped. Preferably, the tip of the wedge-shaped portion extends into the tip of the cam.

In an alternative embodiment, the portion adjoining the partially circular portion is also partially circular, and the center of the adjoining portion differs from that of the existing partially circular portion. Thus in this embodiment, the hole is made, for example, of two circles which have staggered centers relative to each other and which overlap each other, and thus result in a bore shaped like the numeral 8.

In one embodiment, the carrier unit is produced in the form of a unit comprising a hole comprising an internal profiling, at least in part. Thus in this embodiment, the carrier unit is also provided with an internal geometry that reduces the weight of the camshaft. Thus the preceding embodiments addressed the requirement of weight reduction, in particular. In further embodiments, recesses are produced additionally or alternatively in the components of the camshaft, namely the carrier unit and/or the at least one functional element. That is, the weight reduction is achieved partially or completely by way of the selection of the material and/or partially or completely by way of the specification of the geometry of the components or the camshaft per se. In one embodiment, the first modification process or the second modification process involves, at least in part, a blasting of the surface, preferably shot blasting or glass-bead blasting, more particularly shot peening. In this embodiment, the surface is blasted with glass beads or shot and thus modified.

The invention further relates to a camshaft which is fabricated at least in sub-steps of the method according to at least one of the embodiments thereof described above.

BRIEF DESCRIPTION OF THE DRAWINGS

The invention will be explained in further detail hereinafter with reference to illustrative embodiments shown in the accompanying drawing figures, in which.

DETAILED DESCRIPTION OF PREFERRED EMBODIMENTS

Figure 1:
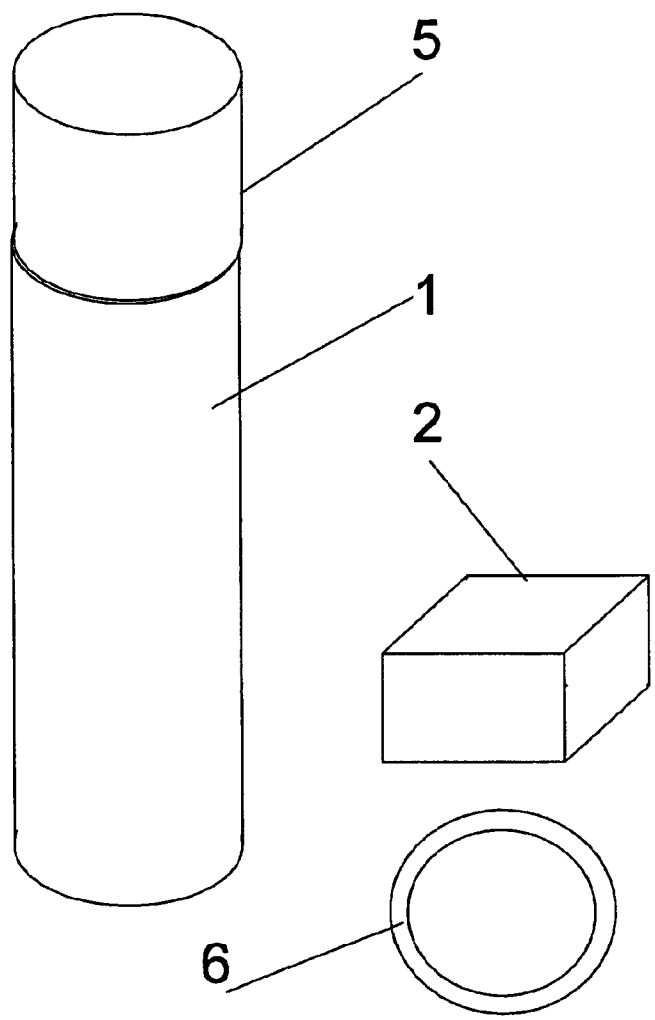
FIG. 1: shows four blanks for the fabrication of a camshaft, partially in the form of a three-dimensional representation and partially as a top view.

FIG. 1 shows a first blank 1 and a further blank 5, from which a carrier unit is produced by a cold-forming operation, for example, in at least one process step. The two blanks already have a cylindrical shape. The figure further shows the second blank 2, from which a cam is produced, for example, by a punching and hot-forming operation. The top view additionally shows a further blank 6 that can be, for example, a bearing ring which is introduced into the cam produced from the second blank 2.

Figure 2:
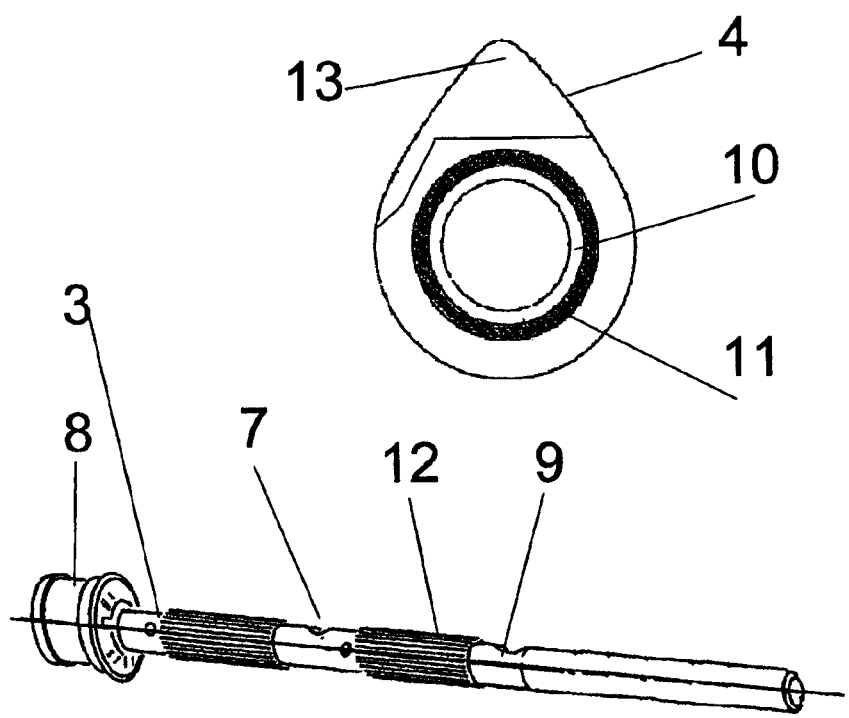
FIG. 2: is a three-dimensional representation of a carrier unit and a top view of a camshaft.

FIG. 2 shows a camshaft as an example of a functional element 4. A bearing ring 11, the internal surface of which is the functional surface 10 that bears the second coating, is introduced into the functional element 4. The coating is, for example, one that increases the friction coefficient so that the joint between the functional element 4 and the carrier unit 3 is improved. Furthermore, the tip and a portion of one end of the functional element 4 form the modification portion 13. In this modification portion 13, the surface of the functional element 4 is hardened, in this case, up to the line indicating the penetration depth; that is, the properties of the functional element 4 at this location differ from those of the remaining regions thereof.

The carrier unit 3 is further shown in FIG. 2. An open end of the carrier unit 3 is closed by a toothed wheel 8 that is connected to the carrier unit 3, for example, by friction welding. The carrier unit 3 comprises indentations 7 into which additional functional elements such as transmitter wheels can be introduced, for example. A duct-like structure of the carrier unit 3, in which oil is guided, for example, opens out into an indentation of such type.

FIG. 2 also shows the modification region 12, in which there is introduced a profiling in this case. In addition, there is located a functional portion 9 that bears the first coating. Advantageously, the coatings are applied specifically only to those portions of the carrier unit 3 and the functional element 4 that are intended for the same. When the functional element or functional elements is/are applied to the carrier unit, it is ensured that there is no contact between the functional element and the carrier unit or that the advantage of at least one coating, for example, the improvement of antifrictional properties is utilized specifically for the application. Depending on the embodiment, the coatings are provided for permanent retention on the camshaft or the components thereof or at least one coating is substantially required and provided only for the fabrication of the camshaft.

Figure 3:
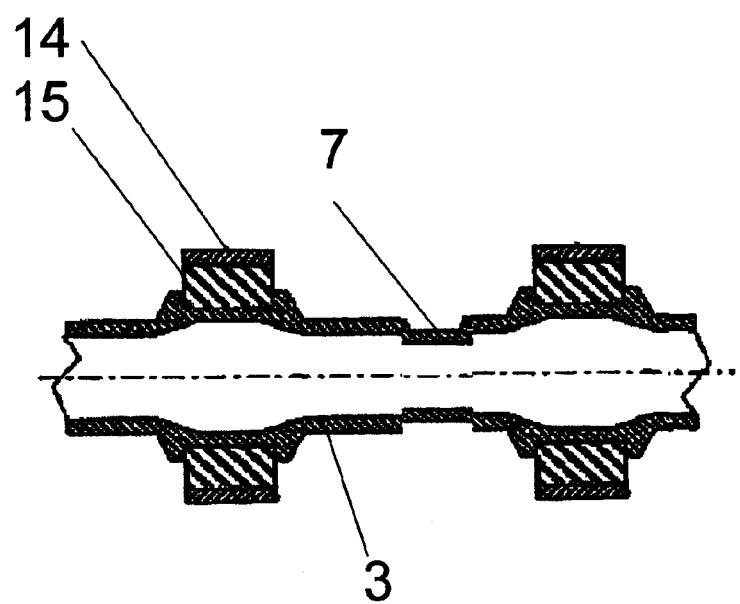
FIG. 3: is a cross-section of a portion of a camshaft comprising bearing blocks.

FIG. 3 shows a portion of a camshaft, of which the carrier unit 3 in this case rests on two bearing blocks 14. The figure shows the protuberances and indentations 7 in the carrier unit 3. Rolling bearings 15 are provided around the protuberances.

The fabrication process includes at least the following steps, for example: the materials of the first and the second blank are selected according to the first and second optimization requirements. The carrier unit and a functional element are produced from the two blanks. Additionally, further functional elements can also be produced. Coatings are applied, entirely or only partially, to the carrier unit and/or the functional element according to third and fourth optimization requirements respectively.

Additionally or alternatively, the surfaces of the carrier unit and/or the functional element or partially also the coatings, depending on the embodiment, are subjected to a modification according to fifth and sixth optimization requirements respectively, which modification relates to the composition or at least one property. The term "composition" here refers to the ratio of the materials present. Thus, for example, one layer is modified specifically in relation to the remainder.

The functional element is applied to the carrier unit and connected to the same before, during or after the application of the coatings or the modification of the surfaces. It is also possible, in particular, to dispense with coating and modification processes on regions of a component and also to readily combine coatings and modifications on a component.

Figure 4:
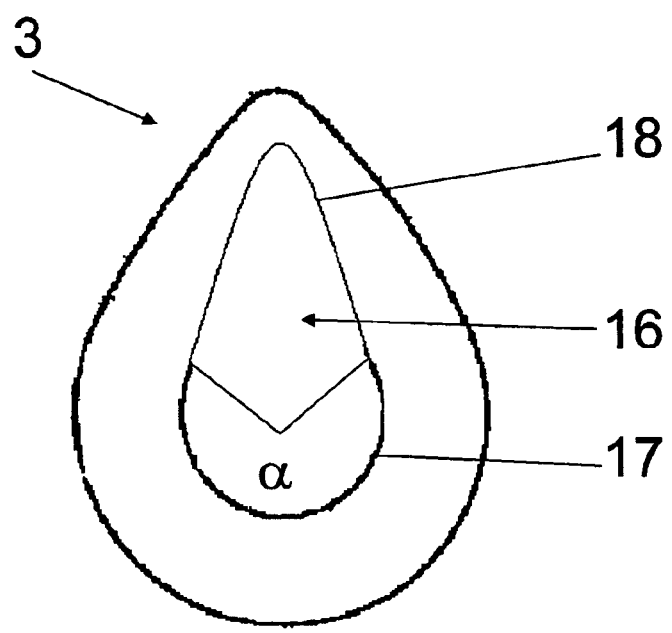
FIG. 4: is a cross-section of a further variant of a cam.

FIG. 4 shows a cross-section of a further variant of a functional element 3 that is in the form of a cam. The functional element 3 has a through hole 16 that deviates, in this variant, from the circular cross-section shown in FIG. 2. The geometry of the hole 16 is selected such that there is provided a circular portion 17, which is adjoined by a portion 18 that encompasses a larger cross-sectional area than the one that would result if this portion were likewise formed by a circular portion. The non-circular portion 18 can be enlarged further and it thus reduces the weight of the cam 3 since the cam 3, while having the same external contour, has less material between the external contour and the hole 16. If the cam 3 is disposed on the carrier unit by a press fit, the circular portion preferably encloses a solid angle $\alpha$ of at least 180°. In this embodiment, the non-circular portion 18 is formed by a continuous wedge-shaped indentation disposed below the tip of the cam.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within; the scope of the appended claims and equivalents thereof.

The invention claimed is:

1. A method for the fabrication of a camshaft comprising at least one carrier unit and at least one functional element, wherein
   the carrier unit is produced, at least in part, by at least a first machining process from at least a first blank made of a first material,
   the at least one functional element is produced, at least in part, by at least a second machining process from at least a second blank made of a second material in the form of a cam,
   a surface of at least one of the at least one first blank and the carrier unit and the at least one second blank and the functional element is modified up to a penetration depth over at least one region in terms of its composition and/or at least one property by the introduction of nitrogen or a nitrogen compound,
   the surface of at least one of the at least one first blank and the carrier unit and the at least one second blank and the functional element is smoothed, the at least one functional element is applied to the carrier unit, the at least one functional element is attached to the carrier unit, a DLC coating material is applied to at least one function surface of the at least one second blank and/or the functional element before the application of the function element to the carrier unit, and wherein the first material or the second material is, at least in part, a fiber-reinforced material.

2. The method as defined in claim 1, wherein the at least one functional element is attached to the carrier unit so as to be movable in at least one direction and/or about an axis relative to the carrier unit.

* * * * *